US010061011B2

(12) United States Patent
Steiner (10) Patent No.: US 10,061,011 B2
(45) Date of Patent: Aug. 28, 2018

(54) TIME-OF-FLIGHT LOCATION DETERMINATION WITH UNMANAGED WLAN

(71) Applicant: Intel Corporation, Santa Clara, CA (US)

(72) Inventor: Itai Steiner, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 332 days.

(21) Appl. No.: 14/905,089

(22) PCT Filed: Dec. 26, 2013

(86) PCT No.: PCT/US2013/077786
§ 371 (c)(1),
(2) Date: Jan. 14, 2016

(87) PCT Pub. No.: WO2014/193477
PCT Pub. Date: Dec. 4, 2014

(65) Prior Publication Data
US 2016/0231414 A1 Aug. 11, 2016

Related U.S. Application Data

(60) Provisional application No. 61/827,833, filed on May 28, 203.

(51) Int. Cl.
*G01S 5/02* (2010.01)
*G01S 19/11* (2010.01)
(Continued)

(52) U.S. Cl.
CPC .......... *G01S 5/0263* (2013.01); *G01S 5/0036* (2013.01); *G01S 19/11* (2013.01); *G01S 19/48* (2013.01)

(58) Field of Classification Search
CPC ........ G01S 5/02; G01S 5/0263; G01S 5/0036; G01S 3/02; G01S 19/01; G01S 19/48
(Continued)

(56) References Cited

U.S. PATENT DOCUMENTS 8,924,155 B2 * 12/2014 Waters .................. G01S 5/0242
342/451
9,800,707 B2 * 10/2017 Vissa ................ H04M 1/72527
(Continued)

FOREIGN PATENT DOCUMENTS

JP 2011247738 A 12/2011

OTHER PUBLICATIONS

"International Application Serial No. PCT/US2013/077786, International Search Report dated Apr. 24, 2014", 4 pgs.
(Continued)

*Primary Examiner* — Harry K Liu
(74) *Attorney, Agent, or Firm* — Schwegman Lundberg & Woessner, P.A.

(57) ABSTRACT

Systems and techniques for time-of-flight (ToF) location determination with unmanaged WLAN are described herein. Information for ToF measurements may be received. The ToF measurements may be performed with a plurality of WLAN access points (APs), including transmitting an initiator message from the SET (e.g., navigation device) to the plurality of WLAN APs. Results for the ToF measurements may be gathered. The gathered results may be communicated to a position calculator to calculate a position of the SET.

24 Claims, 6 Drawing Sheets (51) Int. Cl.
*G01S 19/48* (2010.01)
*G01S 5/00* (2006.01)

(58) Field of Classification Search
USPC .......................................................... 342/451
See application file for complete search history.

(56) References Cited

U.S. PATENT DOCUMENTS

| | | |
|---|---|---|
| 2004/0203872 A1 | 10/2004 | Bajikar |
| 2006/0217132 A1 | 9/2006 | Drummond-murray et al. |
| 2007/0258393 A1* | 11/2007 | Cam-Winget ............ G01S 5/02 370/310 |
| 2010/0150117 A1 | 6/2010 | Aweya et al. |
| 2012/0201213 A1* | 8/2012 | Banerjea ............. H04W 72/044 370/329 |
| 2012/0289246 A1 | 11/2012 | Huber et al. |
| 2014/0105395 A1* | 4/2014 | Hart ...................... H04W 12/02 380/259 |
| 2014/0295877 A1* | 10/2014 | Hart ........................ H04W 4/02 455/456.1 |

OTHER PUBLICATIONS

"International Application Serial No. PCT/US2013/077786, Written Opinion dated Apr. 24, 2014", 6 pgs.

* cited by examiner

TIME-OF-FLIGHT LOCATION DETERMINATION WITH UNMANAGED WLAN

CROSS-REFERENCE TO RELATED APPLICATIONS

This application is a U.S. National Stage Filing under 35 U.S.C. 371 from International Application No. PCT/US2013/077786, filed Dec. 26, 2013, and published in English as WO 2014/193477 on Dec. 4, 2014, each of which claims priority to U.S. Provisional Patent Application Ser. No. 61/827,833, filed May 28, 2013, each of which is incorporated herein by reference in its entirety.

TECHNICAL FIELD

Embodiments described herein generally relate to location-based services for devices and more specifically to time-of-flight (ToF) location determination with unmanaged wireless local area networks (WLANs).

BACKGROUND

Outdoor navigation and positioning have been widely deployed, including various global navigation-satellite-systems (GNSS) as well as various cellular systems. Indoor navigation and positioning often differs from outdoor navigation and positioning because the indoor environment may inhibit the reception of signals from satellites or cellular base stations. As a result, accurate and real-time indoor navigation and positioning may be difficult to achieve. Mobile devices (e.g., mobile station (STA) or simply STA in the IEEE 802.11 family of standards (hereinafter "802.11")) may have mechanisms to access location information. Such a navigation device is herein referred to as a SET. GNSS (e.g., GPS) is an example of a mechanism that may be used by SETs to get location information. GNSS suffer from various problems, such as difficulty in receiving signals in certain areas (e.g., indoors as noted above) and responsiveness (e.g., a long turn-on time to location acquisition).

Assisted GNSS (A-GNSS) was developed to augment GNSS and resolve some of the previously discussed GNSS shortcomings A-GNSS supplements the generally satellite-signal-only GNSS mechanism with additional data or services. A-GNSS may include supplemental information including: providing a mobile device with precise time; providing satellite data (e.g., orbital data or almanac); signal correction; or position computation based on a provided satellite signal snapshot from the mobile device, among others. AGPS is a variant of A-GNSS. Other examples of A-GNSS may include the use of cellular-based positioning system (e.g., Enhanced cell-id, observed time difference of arrival (OTDOA), enhanced observed time difference (E-OTD)) and wireless local area network (WLAN) access point (AP) received signal strength indication (RSSI).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DESCRIPTION

SETs for use outdoors typically measure the time needed for a signal to travel from a plurality of satellites that are orbiting the Earth to the device. Such systems may include a GNSS (e.g., GPS, GLONASS, Galileo, Beidou, COMPASS, IRNSS, QZSS, etc.). When multiple satellites are used, signal travel time between the satellites with a known position and the SET is used in a process called trilateration to determine SET location. Because the signal velocity is constant and known, the ToF permits a distance to be determined between any given satellite and the SET. Distance measurements to multiple satellites are sufficient to give location (e.g., on the Earth's surface) and even elevation (given enough satellites) using trilateration.

A problem that may occur in indoor locations, such as in buildings, is the inhibition, or blocking, of satellite signals to the SET. Thus, mobile devices used by a person walking indoors may not provide accurate location information. This problem may also occur in automotive navigation when the SET lacks access to satellite signals, such as within a tunnel, a parking garage, or on a street surrounded by tall buildings.

Another problem that may occur is a slow start-up time for traditional satellite SETs. This problem may be exacerbated when the SET is moving (e.g., in a car or train). For example, GPS uses a 1500-bit message sent at a rate of fifty bits-per-second. Thus, it takes thirty seconds for the SET to receive the message, assuming that the SET started to look for the message immediately prior to the start of the transmission. This process may be prolonged, for example if the SET's connection to the GPS satellite is interrupted during the thirty seconds, which may cause the process to start over again.

Indoor navigation may use additional signals to supplement or replace satellite signals to address some of the problems noted above. For example, a ToF of a radio signal traveling from a WLAN Access Point (AP) to the SET and back may be used. The time can be converted into distance by dividing the time by two and multiplying it by the speed of light (299,792,458 meters per second). If several APs are used and the APs have a known location, the distances can be used to find a location of a SET. There are also several different cellular-based positioning systems that may be used in conjunction with GNSS. These may include Enhanced Cell ID (E-CellID or E-CID), Observed Time Difference of Arrival (OTDOA) and WLAN Received Signal Strength Indication (RSSI).

A-GNSS provides protocols and frameworks to interact with existing navigation systems. For example, certain systems may be used to acquire signals from satellites more quickly. Other systems may be used to more quickly determine position, even from fragments of satellite signals. Other systems may use the known positions of cell towers to help determine the position of a receiver. One protocol for A-GNSS is Secure User Plane Location (SUPL). SUPL was developed by the Open Mobile Alliance (OMA) and delivers GNSS information over IP-based networks (such as 3GPP, Long Term Evolution (LTE), LTE Advanced, or WLAN) to a SET and uses the user plane for data transmission, as opposed to the control plane. One set of protocols that uses the control plane for location information is LTE positioning protocol (LPP) and LPP extensions (LPPe).

A SET may communicate with an "assistance server" in addition to the satellites. Because the SET and the assistance server share tasks and the assistance server has a relatively high processing power and access to a reference network, the process of establishing communication with A-GNSS is quicker and more efficient than regular GNSS. The assistance server typically downloads and stores orbital information from satellites ahead of time. Thereafter, when a SET connects to the assistance server, the SET can download the orbital information. The connection to the assistance server is typically several orders of magnitude faster than the connection to a satellite, so the initial position location performance is much improved. Exemplary assistance servers include an Enhanced Serving Mobile Location Center (E-SMLC) or SUPL Location Platform (SLP).

WLAN Time of Flight (ToF) (e.g., WLAN Fine-Time Measurement) may be used in a system that assists a satellite-based navigation system (e.g., A-GNSS). Using the SET (e.g., STA) to initiate ToF measurements allows for unmanaged, heterogeneous, or otherwise incapable WLAN APs to be used for additional location determinations. This additional location determination may be used in A-GNSS. Further, A-GNSS protocols may be enhanced to permit such SET imitated ToF measurements. Such enhancements may include additional or modified information element fields in communications between the SET and WLAN APs, as well as WLAN AP changes to properly respond to such SET initiated ToF measurements.

By using the SET centric ToF measurements, a more general location assistance may be brought to bear on A-GNSS than that currently available. As described below, this new procedure may be integrated (e.g., as enhancements) into A-GNSS protocol feature-sets, such as, OMA Network-initiated location request (NILR), OMA Mobile-terminated Location Request (MTLR), or OMA SET-Initiated location request (SILR) to support WLAN ToF positioning.

Figure 1:
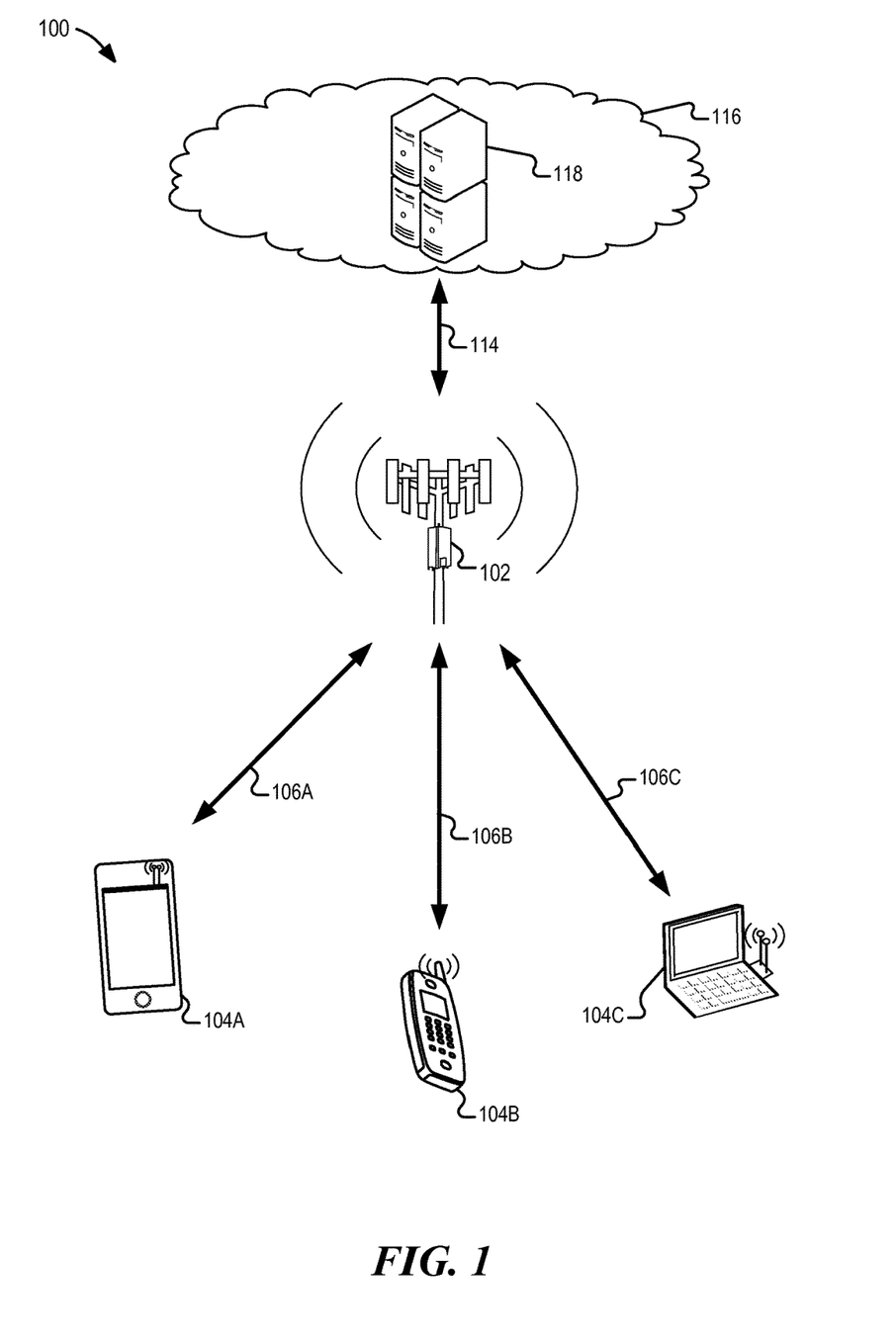
FIG. 1 is an illustration of an example configuration of a communication network architecture, in accordance with some embodiments.

FIG. 1 provides an illustration of an example configuration of a communication network architecture 100 in which a SET may operate. The network architecture 100 is illustrative of communications networks generally, while configuration specific to the present disclosure are discussed below. Within the communication network architecture 100, a carrier-based network such as an LTE/LTE-A cell network operating, for example, according to a standard from a 3GPP standards family, may be established by network equipment 102. The network equipment 102 may include an enhanced or evolved node B (eNodeB) communicating with communication devices 104A, 104B, 104C (e.g., a SET, a user equipment (UE), or a communication station (STA)). The carrier-based network may include wireless network connections 106A, 106B, and 106C with the communication devices 104A, 104B, and 104C, respectively. The communication devices 104A, 104B, 104C are illustrated as conforming to a variety of form factors, including a smartphone, a mobile phone handset, and a personal computer having an integrated or external wireless network communication device.

The network equipment 102 is illustrated in FIG. 1 as being connected via a network connection 114 to network servers 118 in a cloud network 116. The servers 118 may operate to provide various types of information to, or receive information from, communication devices 104A, 104B, 104C, including device location, user profiles, user information, web sites, e-mail, and the like.

Communication devices 104A, 104B, 104C may communicate with the network equipment 102 when in range or otherwise in proximity for wireless communications. As illustrated, the connection 106A may be established between the mobile device 104A (e.g., a smartphone) and the network equipment 102; the connection 106B may be established between the mobile device 104B (e.g., a mobile phone) and the network equipment 102; and the connection 106C may be established between the mobile device 104C (e.g., a personal computer) and the network equipment 102.

The wireless communications 106A, 106B, 106C between devices 104A, 104B, 104C may use a WLAN (e.g., IEEE 802.11 standard protocol), or a protocol such as the current 3rd Generation Partnership Project (3GPP) long term evolution (LTE) time division duplex (TDD)-Advanced systems. In one embodiment, the communications network 116 and network equipment 102 comprises an evolved universal terrestrial radio access network (EUTRAN) using the 3rd Generation Partnership Project (3GPP) long term evolution (LTE) standard and operating in time division duplexing (TDD) mode. The devices 104A, 104B, 104C may include one or more antennas, receivers, transmitters, or transceivers that are configured to operate with WLANs standard protocol, or a protocol such as 3GPP, LTE, or TDD-Advanced or any combination of these or other communications standards.

Antennas in or on devices 104A, 104B, 104C may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to utilize spatial diversity and the different channel characteristics that may result between each of the antennas and the antennas of a transmitting station. In some MIMO embodiments, antennas may be separated by up to $\frac{1}{10}$ of a wavelength or more.

In some embodiments, the mobile device 104A may include one or more of a keyboard, a display, a non-volatile memory port, multiple antennas, a graphics processor, an application processor, speakers, and other mobile device elements. The display may be an LCD screen including a touch screen. The mobile device 104B may be similar to mobile device 104A, but does not need to be identical. The mobile device 104C may include some or all of the features, components, or functionality described with respect to mobile device 104A.

A base station, such as an enhanced or evolved node B (eNodeB), may provide wireless communication services to communication devices, such as device 104A. While the exemplary communication system 100 of FIG. 1 depicts only three devices users 104A, 104B, 104C any combination of multiple users, devices, servers and the like may be coupled to network equipment 102 in various embodiments. For example, three or more users located in a venue, such as a building, campus, mall area, or other area, and may utilize any number of mobile wireless-enabled computing devices to independently communicate with network equipment 102. Similarly, communication system 100 may include more than one network equipment 102. For example, a plurality of access points or base stations may form an overlapping coverage area where devices may communicate with at least two instances of network equipment 102.

Although communication system 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

The mechanisms and techniques described herein enable a location determination of the various communication devices 104A, 104B, 104C, to, for example, supplement an A-GNSS protocol over the communications system 100.

Figure 2:
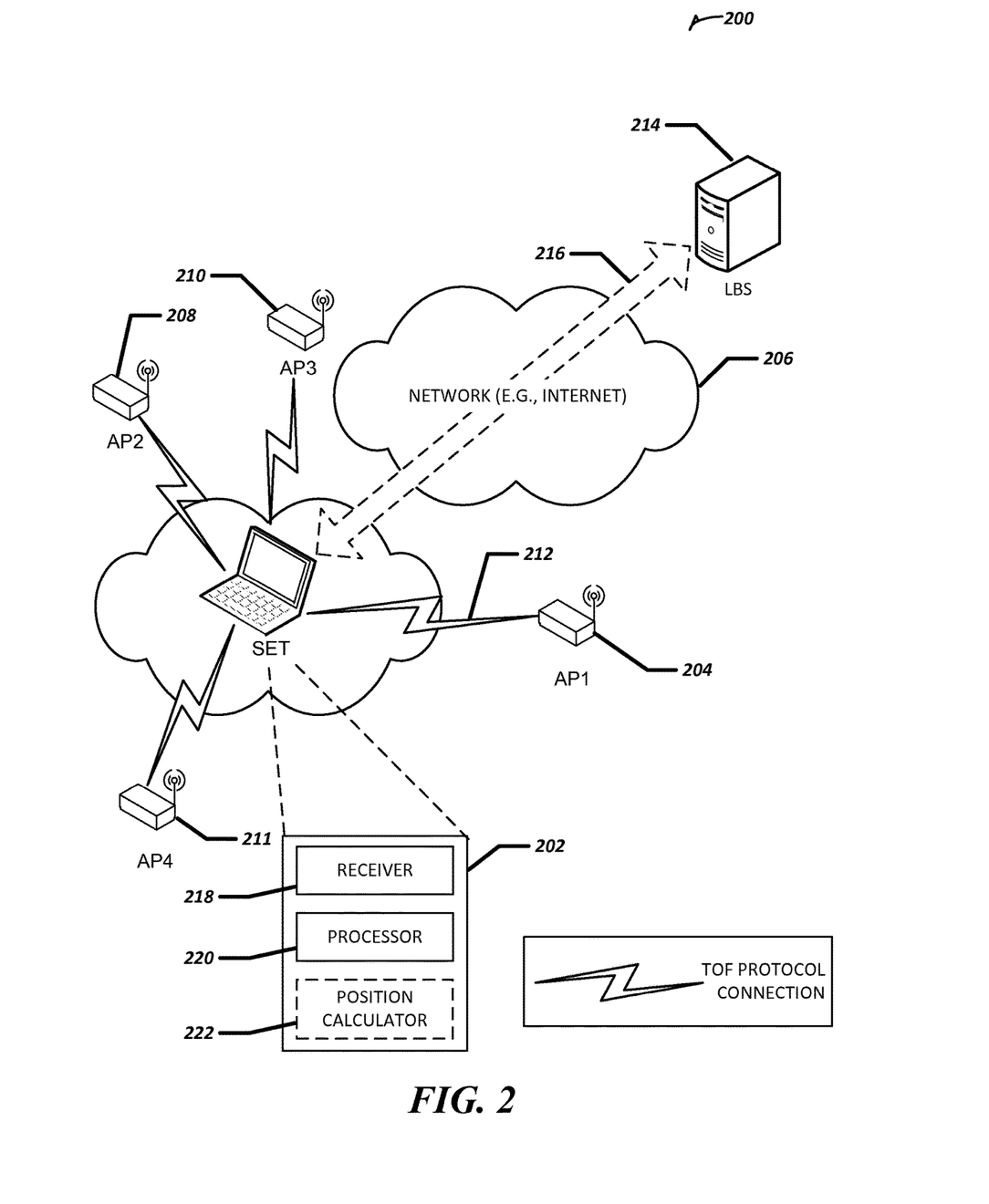
FIG. 2 is a block diagram of an example wireless communication system, in accordance with some embodiments.

FIG. 2 is a block diagram of an example wireless communication system 200 that may utilize the communication network architecture 100 of FIG. 1 for ToF location determination with unmanaged WLANs. The communication system 200 may include a SET 202 that is capable of wireless communication. The SET 202 may include a receiver 218 (e.g., as part of a transceiver) and a processor 220. The processor 220 may be any hardware, or subset of hardware, that can perform the specified operation. An enumeration of such hardware elements is given below with respect to FIG. 6, 7 or 8. In an example, the SET 202 may be a mobile computing device such as a cellular phone, a smartphone, a laptop, a tablet computer, a personal digital assistant or other electronic device capable of wireless communication.

The receiver 218 may receive information for ToF measurements, for example, from the location-based services (LBS) (e.g., assistance server) via communications link 216 (e.g., via a network such as that described above with respect to FIG. 1). In an example, the information for ToF measurements may be received as part of a ToF location request originating from an entity external to the SET 202, such as the LBS 214. In an example, the information for ToF measurements may be in response to a location request originating from the SET 202 for which additional information is requested. Such information may include a list of WLAN APs (e.g., AP1 204, AP2 208, AP3 210, or AP4 211) to use for ToF measurements. In an example, the information may include an access protocol for one or more WLAN APs in the list. Such position information may be used by the SET 202 to, for example, calculate its own position or identify WLAN APs to use, or to prioritize for, ToF measurements.

In an example, the access protocol may include credentials or an encryption key that the SET 202 may use to access one or more of the APs in the list. Thus, the SET 202 may access otherwise secure APs to perform ToF measurements. In an example, the information may include WLAN AP positions for one or more members of the list of WLAN APs. Other examples of access protocols may include specifics of accepted message exchanges to perform ToF measurements, such as OMA SUPL and OMA LPPe, as described below. The processor 220 may be arranged (e.g., configured, constructed, built, etc.) to perform, using the information for ToF measurements received at the receiver, the ToF measurements with a plurality of WLAN APs (e.g., e.g., AP1 204, AP2 208, AP3 210, or AP4 211). During the performance of the ToF measurements, the processor 220 transmits (e.g., causes a transmission via a transceiver of the SET 202) an initiator message (e.g., message 212 to AP1 204) to the plurality of APs. By invoking the initiator message from the SET 202, the WLAN ToF measurements may be made using WLAN APs that are unmanaged, or even on different networks.

The processor 220 may also be arranged to gather results of the ToF measurements. Gathering the results may include both the recording of the data as well as other processing of the data. In an example, gathering the results may include determining respective ranges (e.g., distances) to the plurality of WLAN APs. As noted above, this procedure involves using the known speed of light and the time it takes for a message (e.g., the initiator message) to travel from the SET 202 to a WLAN AP (e.g., AP1 204). In an example, gathering the results may include determining one or both of respective (e.g., to each WLAN AP) timer (e.g., from the SET 202 to an AP, from an AP to the SET 202, or round trip) data or transmit/receive (Tx/Rx) channel estimation data.

The processor 220 may be arranged to communicate the results to a position calculator 222. In an example, the position calculator 222 is local to (e.g., a part of, integrated with, belonging to, etc.) the SET 202. In an example, the position calculator 222 is remote from (e.g., distant, accessible indirectly via a network (e.g., 206), in a different machine (e.g., LBS 214), etc.) from the SET 202. When local, the processor 220 may perform the communication to the position calculator 222 via an interlink (e.g., bus, data port, etc.) of the SET 202. When remote, the processor 220 may perform the communication to the position calculator via a network interface, such as via network interface card (NIC), or a wireless transceiver.

In an example, where the position calculator 222 is remote from the SET 202, the processor 220 may be arranged to transmit the gathered results to the position calculator to use in trilaterating, or any other location estimation calculation or technique, to determine a location of the SET 202. In an example, when the position calculator 222 is local to the SET 202, the position calculator may be arranged to use the gathered results and WLAN AP positions to trilaterate a position for the SET 202. In an example, where the local position calculator 222 calculates the SET's position, the processor may be arranged to communicate that position to the LBS 214. The LBS may be used by, for example, a carrier based network (e.g., such as that described in FIG. 1) to facilitate A-GNSS positioning of the SET 202.

The previously described SET 202 and the system 200, illustrate ToF location determination in an unmanaged WLAN. The following are two OMA protocols used for SET positioning for use in A-GNSS, the OMA SUPPL and OMA LPPe protocols. These protocols may be modified as follows to facilitate to enable SET 202 initiated ToF measurements with WLAN APs. These modifications not only help to deal with unmanaged WLANs, but also to expand carrier/operator LBS facilities to use WLAN as a positioning mechanism, and also expand positioning options for emergency location services (e.g., 911).

OMA SUPL:

Several SUPL messages, including "SUPL Init," contain a Positioning Method parameter. This parameter may be modified to include WLAN-FineTimeMeasurements type (e.g., defined as a new data type) as a supporting positioning node. In an example, SUPL Init may be the initial message from the H-SLP or the E-SLP to the SET 202 in a network initiated positioning operation. In an example, the SUPL Init message may have the following definition:

| Parameter | Presence | Description |
|---|---|---|
| Positioning Method | M | Defines the positioning technology desired by the SLP for the SUPL session (A-GPS SET Assisted, A-GPS SET Based, Autonomous GPS, EOTD, OTDOA, AFLT, eCID, A-GNSS SET assisted, A-GNSS set based or Autonomous GNSS. WLAN ToF, or a WLAN ToF supporting type may also be options. A supporting type includes a reference to a primary type, such as A-GNSS. If positioning Method is A-GNSS SET Assisted or A-GNSS SET based, the parameter GNSS Positioning Technology MUST be present to indicate the actual positioning technologies. If Positioning Method is Autonomous GNSS, the parameter GNSS Positioning Technology MAY be present. In line with the SET Capabilities, the SLP MAY change the positioning method used in the actual positioning session regardless of the positioning method parameter. |

As shown in the definition, the Positioning Method parameter defines the positioning technology desired by the SLP (e.g., the LBS 214) for the SUPL session. By including WLAN ToF as a primary type, it may be used to position the SET 202. In an example, using the WLAN ToF and a supporting type includes the further designation of a primary type. In such an arrangement, the secondary type may be used to facilitate positioning of the primary type.

The Supported Network Information parameter may include support for WLAN ToF as an optional type. An example definition is as follows:

| Parameter | Presence | Description |
|---|---|---|
| Supported Network Information | O | This parameter defines the type(s) of Network Measurement information which the SET 202 is allowed to send as part of Location ID and Multiple Location IDs. If this parameter is not present, the SET 202 may send any Network Measurement information it supports and has available. This parameter is also used as reporting criteria for stored historical enhanced cell/sector measurements. |

The SET Capabilities parameter may include support for WLAN ToF as a positioning technology. The following definitions described the SET Capabilities parameters:

| Parameter | Presence | Value/Description |
|---|---|---|
| SET capabilities | — | SET capabilities (not mutually exclusive) are set forth in terms of supported positioning technologies and positioning protocols. During a particular SUPL session, a SET 202 may send its capabilities more than once. Specifically, in SET initiated cases, the SET capabilities may be sent in SUPL START, SUPL TRIGGERED START, and in SUPL POS INIT messages. For immediate requests, the SET capabilities may be prevented from changing during this particular session. For triggered requests, the SET capabilities may change during a session. The SET Capabilities parameter may also be used by the SET 202 to inform the H-SLP about its service capabilities. |
| >Pos Technology | M | Defines the positioning technology. Zero or more of the following positioning technologies (including those listed in the optional A-GNSS Position Methods structure): SET-assisted A-GPS SET-based A-GPS Autonomous GPS AFLT E-CID e-OTD OTDOA WLAN ToF NOTE: The E-CID bit SHALL be set only when TA and/or NMR information is proved within the Location ID IE. |

OMA LPPe:

OMA-LPPe-WLAN-AP-RequestCapabilities and ProvideCapabilities may include an additional bit or information element (IE) for WLAN ToF. The following is a definition of OMA-LPPe-WLAN-AP-RequestCapabilities:

WLAN AP Capability Information request:
OMA-LPPe-WLAN-AP-RequestCapabilities
The IE OMA-LPPe-WLAN-AP-RequestCapabilities is used to request WLAN AP positioning capabilities information from a target (e.g., SET 202)
-- ASN1START
OMA-LPPe-WLAN-AP-RequestCapabilities ::= SEQUENCE {
 ...
}
-- ASN1STOP The following is an example of a definition for a ProvideCapabilities message:

WLAN AP Capability Information request:
OMA-LPPe-WLAN-AP-ProvideCapabilities
The IE OMA-LPPe-WLAN-AP-ProvideCapabilities is used by a target to provide its capabilities for WLAN AP positioning -continued

```
to a server (e.g., LBS 214)
-- ASN1START
OMA-LPPe-WLAN-AP-ProvideCapabilities ::= SEQUENCE {
    wlan-ecid-MeasSupported BIT STRING {
        apSSID          (0),
        apSN            (1),
        apDevType       (2),
        apPhyType       (3),
        apRSSI          (4),
        apChanFreq      (5),
        apRTD           (6),
        ueTP            (7),
        ueAG            (8),
        apRepLoc        (9),
        non-serving     (10),
        historic        (11) }
                        (SIZE(1..16)),
    wlan-types-supported
        OMA-LPPe-WLAN-AP-TYPE-LIST      OPTIONAL,
    ap-Capability
        OMA-LPPe-WLAN-AP-Capability     OPTIONAL,
    Wlan-ap-ADSupported BIT STRING {
        aplist              (0),
        aplocation          (1),
        locationreliability (2),
        transmit-power      (3),
        antenna-gain        (4),
        coveragearea        (5),
        non-serving         (6) }
                        (SIZE(1..16)),
    ...
}
OMA-LPPe-WLAN-AP-Capability ::= SEQUENCE {
    apMACAddress    OMA-LPPe-WLAN-AP-ID,
    apTypes         OMA-LPPe-WLAN-AP-Type-List,
    ...
}
-- ASN1STOP
```

As noted above, there are various LTE Positioning Protocol (LPP) and LTE Positioning Protocol Extensions (LPPe) messages that may have additional bits or information elements added to provide functionality for WLAN ToF capabilities.

Under LPP and LPPe, the LBS 214 sends the RequestCapabilities message to the SET 202. The SET 202 responds with a ProvideCapabilities message. These messages may be modified to facilitate WLAN ToF. For example, the OMA-LPPe-WLAN-AP-RequestCapabilities message and the ProvideCapabilities message may be changed to include an additional bit or IE for WLAN ToF.

An OMA-LPPe-WLAN-AP-RequestLocationInformation message may also include an additional bit or IE for WLAN ToF, which may include the specific sub-type of WLAN ToF procedure to be used. The following is an example, of an OMA-LPPe-WLAN-AP-RequestLocationInformation message definition:

```
WLAN AP Location Information request:
OMA-LPPe-WLAN-AP-RequestLocationInformation
The IE OMA-LPPe-WLAN-AP-RequestLocationInformation is used
to request WLAN AP measurements (SET 202/UE assisted)
-- ASN1START
OMA-LPPe-WLAN-AP-RequestLocationInformation
    ::= SEQUENCE {
    requestedMeasurements BIT STRING{
        apSSID          (0),
        apSN            (1),
        apDevType       (2),
        apPhyType       (3),
        apRSSI          (4),
        apChanFreq      (5),
        apRTD           (6),
        ueTP            (7),
        ueAG            (8),
        apRepLoc        (9),
        non-serving     (10),
        historic        (11) } (SIZE(1..16)),
    ...
}
-- ASN1STOP
```

The OMA-LPPe-WLAN-AP-RequestLocationInformation message may also include AP List and AP locations as optional elements, similar to the elements in OMA-LPPe-WLAN-AP-RequestAssistanceData:

```
requestedAD BIT STRING{
    aplist              (0),
    aplocation          (1),
    locationreliability (2),
    transmit-power      (3),
    antenna-gain        (4),
    coveragearea        (5),
    non-serving         (6) } (SIZE(1..16)),
requestedAPTypes    OMA-LPPe-WLAN-AP-Type-List,
```

The OMA-LPPe-WLAN-AP-RequestLocationInformation message may also contain an optional element for security keys or other credentials that may be used for the WLAN ToF procedure with the respective WLAN AP.

The SET 202 may provide an OMA-LPPe-LocationInformation message. The OMA-LPPe-LocationInformation message may include an optional IE for WLAN ToF (e.g., OMA-LPPe-WLAN-AP-FineTimeMeasurement). The IE may include any one or more of the following:

Timers: Time of Departure of measurement initiator message; Time of Arrival of measurement initiator message; Time of Departure of measurement responder message; Time of Arrival of measurement responder message; and Accuracy or error for each timer.

Ranges: Range in distance (e.g., meters, feet, etc.); and Accuracy or error.

Channel Estimation: Channel bandwidth; and SET 202 Tx/Rx Channel estimation data Given the above descriptions, the following is an example of a scenario for ToF location determination with unmanaged WLANs.

The SET 202 may perform ToF measurements with a plurality of WLAN APs (e.g., any two or more of AP1 204, AP2 208, AP3 210, or AP4 211). The ToF measurements may include the SET 202 transmitting an initiator message (e.g., message 212 to AP1 204) to the respective APs.

The AP1 204 may, for example, be a base station or a fixed wireless router. The SET 202 may establish a communication link (e.g., a secure or an unsecured communication link) with the Ap1 204 in order to, for example, reach the network 206 (e.g., the Internet). In an example, the SET 202 may communicate with an LBS 214 (e.g., secure access point locations server) via a link 216 (e.g., which may be either secured or unsecured), for example, through the AP1 204 and the network 206. The link 216 may, for example, be secured and use HyperText Transfer Protocol Secured (HTTPS) and transport layer security (TLS) to prevent the interception or unauthorized manipulation of data exchanged between the SET 202 and the LBS 214.

In an example, the AP2 208 or the AP3 210 may be within range of the SET 202. The SET 202 may communicate with the AP1 204, the AP2 208 or the AP3 210. The SET 202 may request location information regarding one or more of the AP1 204, the AP2 208, the AP3 210, or any other AP (e.g., AP4 211), from the LBS 214. In response to the location information request, the LBS 214 may provide the SET 202, via link 216, with the location information corresponding to the requested AP. In an example, the LBS 214 may also provide the SET 202 with one or more keys that the SET 202 may use to securely communicate with a requested AP.

The AP1 204, the AP2 208, and the AP3 210 may all provide timing and/or location information to the SET 202 over a communication link that may be established using a key, or other security information obtained by the SET 202, from the LBS 214. The timing information may include time-of-arrival or time-of-departure data with respect to the ToF protocol exchange that are local to each AP. The location information may include an updated location of a respective AP.

There are several different types of network-based location requests that may be used with WLAN ToF positioning: 1) The network initiates a location request. In response to the location request, the SET performs WLAN ToF with a plurality of WLAN APs, calculates its position (using the measurements with respect to the known AP locations) and reports its position to the network. 2) The network initiates a location request. In response, the SET performs WLAN ToF measurements with a plurality of WLAN APs, determines the respective ranges from each of the APs and reports the Fine-Time Measurements to the network. The network may then use these results to calculate the position of the SET. 3) The network initiates a location request. In response, the SET performs Fine Time Measurements (ToF) with several Wi-Fi APs, reports Fine-Time Measurements Results to the network, including the timers and the Tx/Rx channel estimation data (for post-processing of Line-Of-Sight detection by the network). The network can use these results to calculate the position of the SET.

The mechanisms and structures described above may allow WLAN ToF location request for devices in an unmanaged, public, mixed or heterogeneous WLANs or WLAN APs, which may not be necessarily under the same LAN. Further, WLAN ToF expands carrier/operator Location Based Services (LBS) facilities. Additionally, WLAN ToF provides an additional and robust location service to further enable emergency location services.

Figure 3:
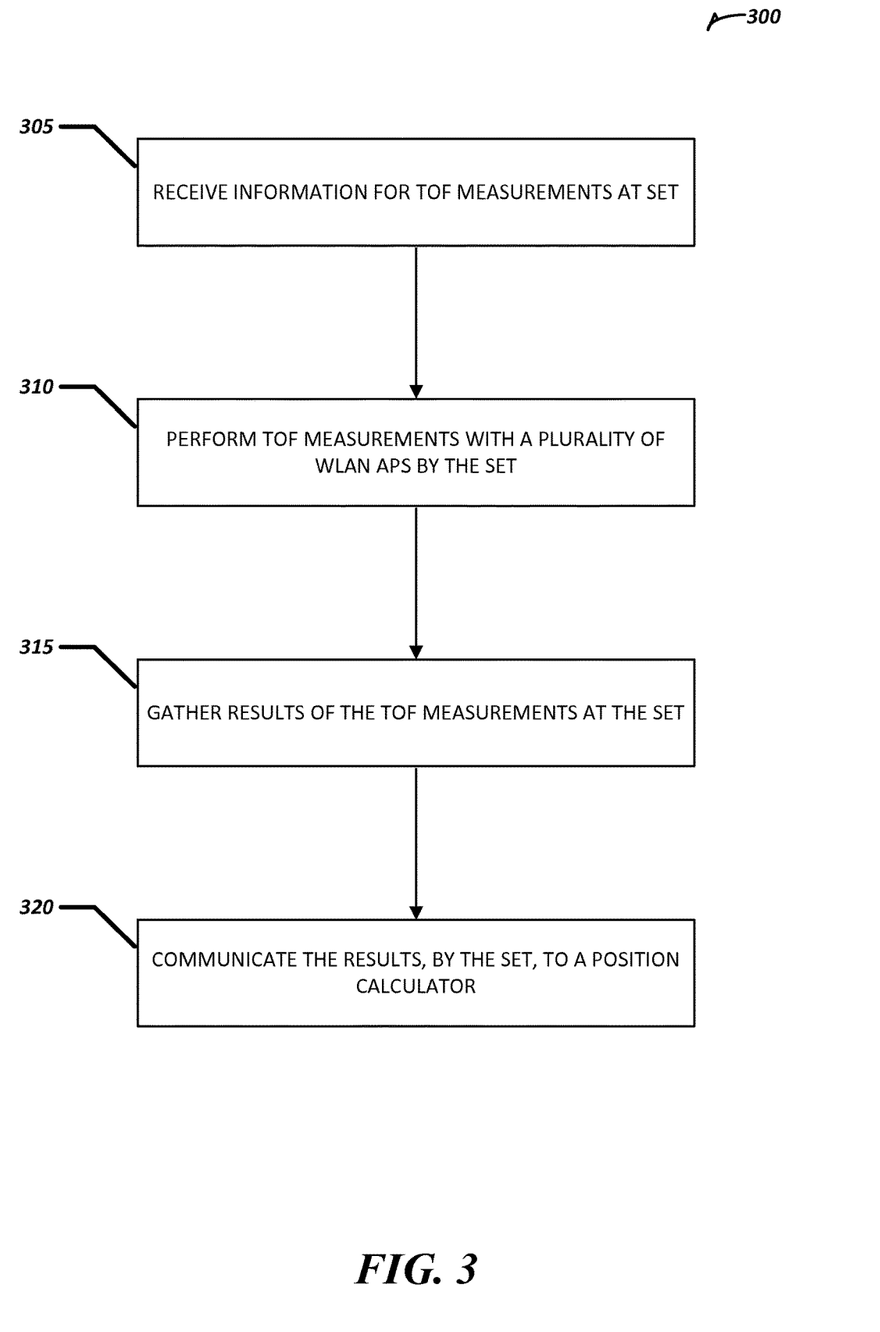
FIG. 3 is a flowchart illustrating an example method, in accordance with some embodiments.

FIG. 3 is a flowchart illustrating an example method 300 for

At operation 305, information for ToF measurements may be received via a receiver of a SET. The ToF measurements may include a fine-time-measurement of a radio signal between two positions. Fine-time-measurement designates a timing accuracy sufficient to measure the time for the speed of light to travel a reasonable distance to an AP. For example, a one millisecond (ms) resolution may provide a within several hundred meter accuracy. Thus, in an example, the Fine-time-measurement is in microsecond resolution, such as tens of microseconds or sub-tens of microseconds.

In an example, the information for ToF measurements may include a list of WLAN APs to use for the ToF measurements. In an example, the information may include WLAN AP positions corresponding to members of the list of WLAN APs. In an example, the information may include an access protocol to a WLAN AP in the plurality of WLAN APs. The access protocol may include at least one of a credential or an encryption key to access the WLAN AP.

At operation 310, the ToF measurements may be performed (e.g., via hardware of the SET) with a plurality of WLAN APs using the information. The performance of the ToF measurements may include the SET transmitting an initiator message.

At operation 315, results of the ToF measurements may be gathered (e.g., via hardware of the SET). In an example, gathering the measurements may include determining respective ranges to the plurality of WLAN APs. In an example, gathering the results may include determining respective timer or Tx/Rx channel estimation data to the plurality of WLAN APs.

At operation 320, the results may be communicated (e.g., via hardware of the SET) to a position calculator. In an example, the communicating may include transmitting the ranges gathered in the results of operation 315 to the position calculator (e.g., where the position calculator is remote from the SET). In an example, the communicating may include transmitting the timer or transmit/receive (Tx/Rx) channel estimation data gathered in the results of operation 315 to the position calculator (e.g., where the position calculator is remote from the SET).

In an example, an optional operation of trilaterating (e.g., via a position calculator local to the SET) a position of the SET may be performed using the results of the ToF measurements of operation 315 and WLAN AP positions. In an example, the communicating of operation 320 may include communicating (e.g., via hardware of the SET) the position of the SET to an LBS of a network to which the SET belongs.

Optionally, method 300 may include one or more operations defined by any of a variety of network protocols and standards in licensed or unlicensed spectrum bands, including Wi-Fi P2P communications performed in connection with an IEEE 802.11 standard (for example, Wi-Fi Direct communications facilitated by software access points (Soft APs)), 3GPP LTE/LTE-A communications (for example, LTE Direct (LTE-D) communications established in a portion of an uplink segment or other designated resources), machine-to-machine (M2M) communications performed in connection with an IEEE 802.16 standard, and the like.

Though arranged serially in the example of FIG. 3, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Although the preceding examples indicated the use of device-to-device communications in connection with 3GPP and 802.11 standard communications, it will be understood that a variety of other communication standards capable of facilitating device-to-device, machine-to-machine, and P2P communications may be used in connection with the presently described techniques. These standards include, but are not limited to, standards from 3GPP (e.g., LTE, LTE-A, HSPA+, UMTS), IEEE 802.11 (e.g., 802.11a, 802.11b, 802.11g, 802.11n, 802.11ac), 802.16 (e.g., 802.16p), or Bluetooth (e.g., Bluetooth 4.0, or other standard defined by the Bluetooth Special Interest Group) standards families. Bluetooth, as used herein, may refer to a short-range digital communication protocol defined by the Bluetooth Special Interest Group, the protocol including a short-haul wireless protocol frequency-hopping spread-spectrum (FHSS) communication technique operating in the 2.4 GHz spectrum.

Figure 4:
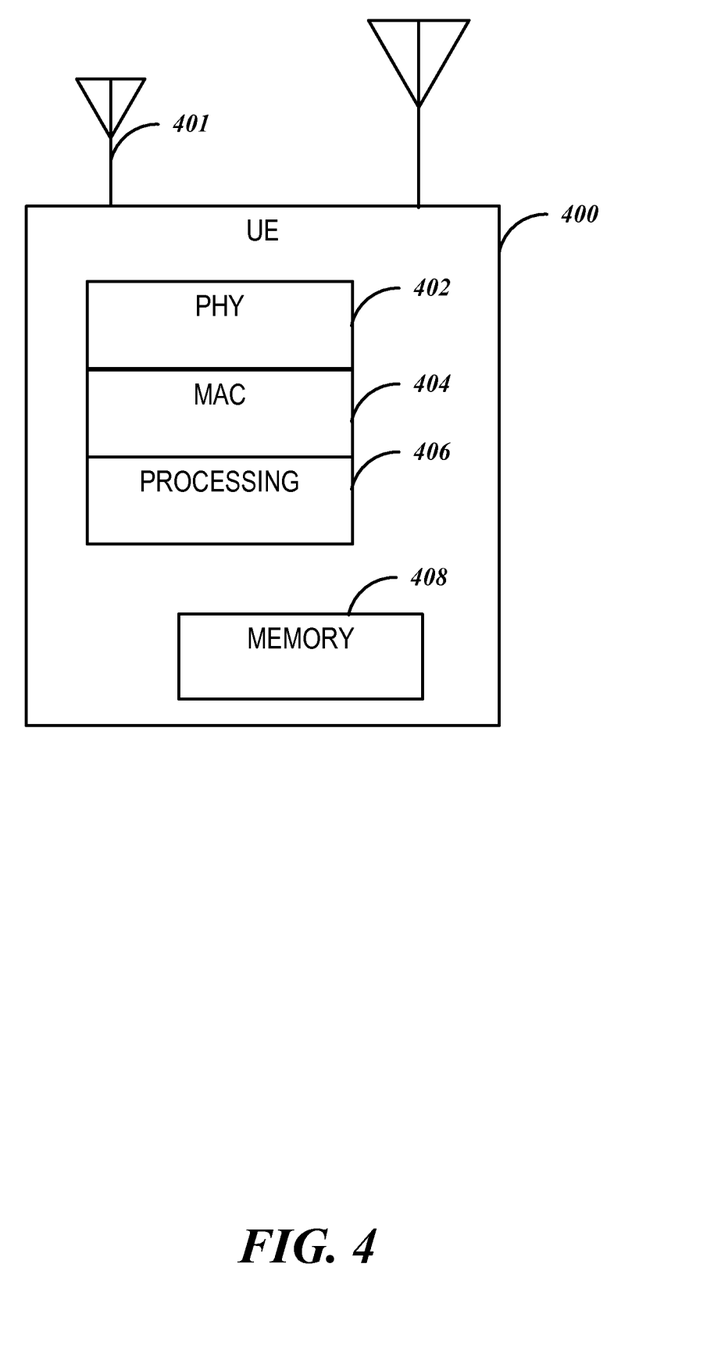
FIG. 4 illustrates a functional block diagram of a UE in accordance with some embodiments.

FIG. 4 illustrates a functional block diagram of a UE 400 (e.g., SET) in accordance with some embodiments. The UE 400 may be suitable for use as device 102A (FIG. 1) or SET 202 (FIG. 2). The UE 400 may include physical layer circuitry 402 for transmitting and receiving signals to and from eNodeBs using one or more antennas 401. UE 400 may also include processing circuitry 406 that may include, among other things a channel estimator. UE 400 may also include a memory 408. The processing circuitry may be configured to determine several different feedback values discussed below for transmission to the eNodeB. The processing circuitry may also include a media access control (MAC) layer 404.

In some embodiments, the UE 400 may include one or more of a keyboard, a display, a non-volatile memory port, multiple antennas, a graphics processor, an application processor, speakers, and other mobile device elements. The display may be an LCD screen including a touch screen.

The one or more antennas 401 utilized by the UE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

Although the UE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 400 may be configured with the instructions to perform the operations described herein.

In some embodiments, the UE 400 may be configured to receive OFDM communication signals over a multicarrier communication channel in accordance with an OFDMA communication technique. The OFDM signals may comprise a plurality of orthogonal subcarriers. In some broadband multicarrier embodiments, eNodeBs (including macro eNodeB and pico eNodeBs) may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the inventive subject matter described herein is not limited in this respect. In these broadband multicarrier embodiments, the UE 400 and the eNodeBs may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, December 2010, including variations and evolutions thereof.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

Two types of reference signals may be transmitted by an eNodeB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 400 and the eNodeBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the UE 400 may be part of a portable wireless communication device, such as a PDA, a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 400 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNodeB may be based on the CQI. The PMI may be a vector that is calculated by the UE and reported to the eNodeB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 400. The CQI allows the UE 400 to propose to an eNodeB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNodeB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some coordinated multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beam forming.

Figure 5:
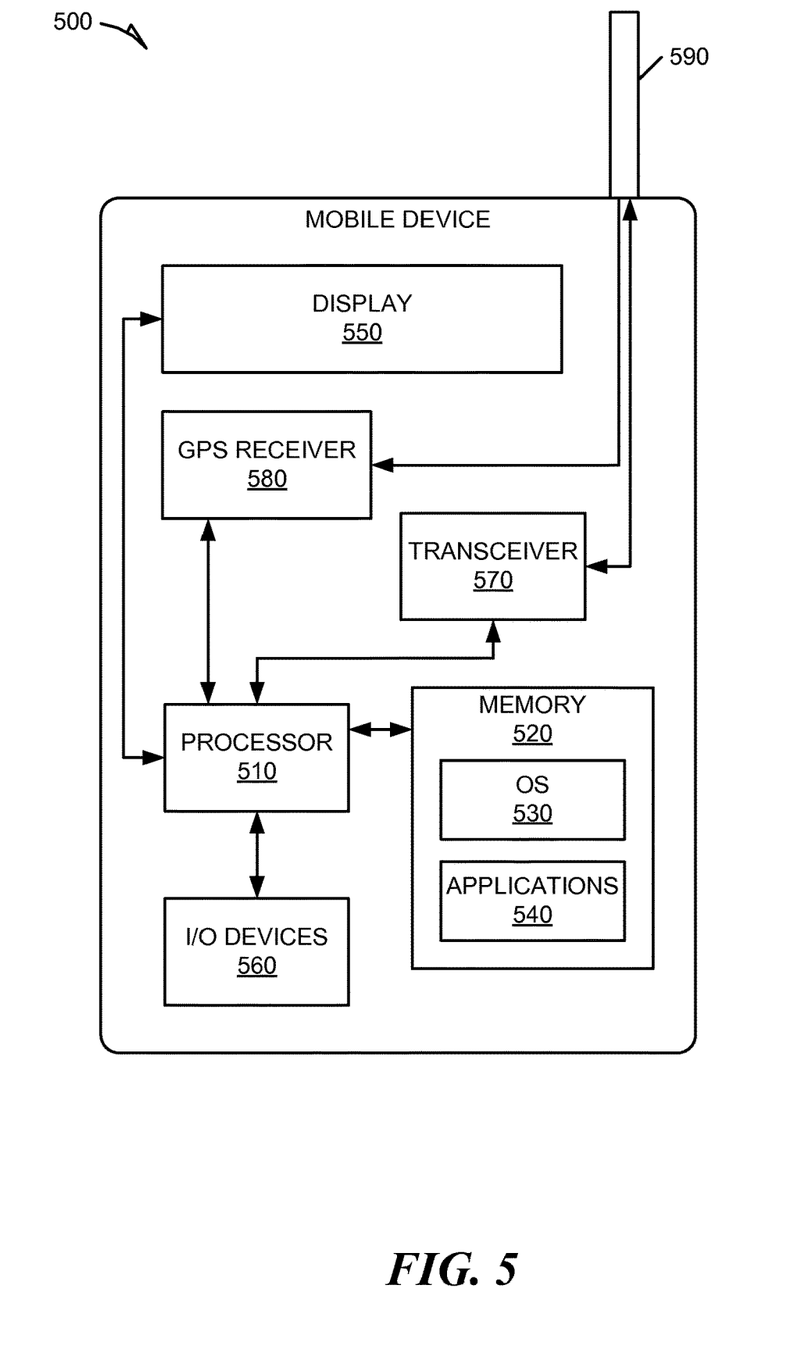
FIG. 5 is a block diagram illustrating a mobile device in accordance with some embodiments.

FIG. 5 is a block diagram illustrating a mobile device 500 (e.g., SET), upon which any one or more of the techniques (e.g., methodologies) discussed herein may be performed. The mobile device 500 may include a processor 510. The processor 510 may be any of a variety of different types of commercially available processors suitable for mobile devices, for example, an XScale architecture microprocessor, a Microprocessor without Interlocked Pipeline Stages (MIPS) architecture processor, or another type of processor. A memory 520, such as a Random Access Memory (RAM), a Flash memory, or other type of memory, is typically accessible to the processor 510. The memory 520 may be adapted to store an operating system (OS) 530, as well as application programs 540. The OS 530 or application programs 540 may include instructions stored on a computer readable medium (e.g., memory 520) that may cause the processor 510 of the mobile device 500 to perform any one or more of the techniques discussed herein. The processor 510 may be coupled, either directly or via appropriate intermediary hardware, to a display 550 and to one or more input/output (I/O) devices 560, such as a keypad, a touch panel sensor, a microphone, etc. Similarly, in an example embodiment, the processor 510 may be coupled to a transceiver 570 that interfaces with an antenna 590. The transceiver 570 may be configured to both transmit and receive cellular network signals, wireless data signals, or other types of signals via the antenna 590, depending on the nature of the mobile device 500. Further, in some configurations, a GPS receiver 580 may also make use of the antenna 590 to receive GPS signals.

Figure 6:
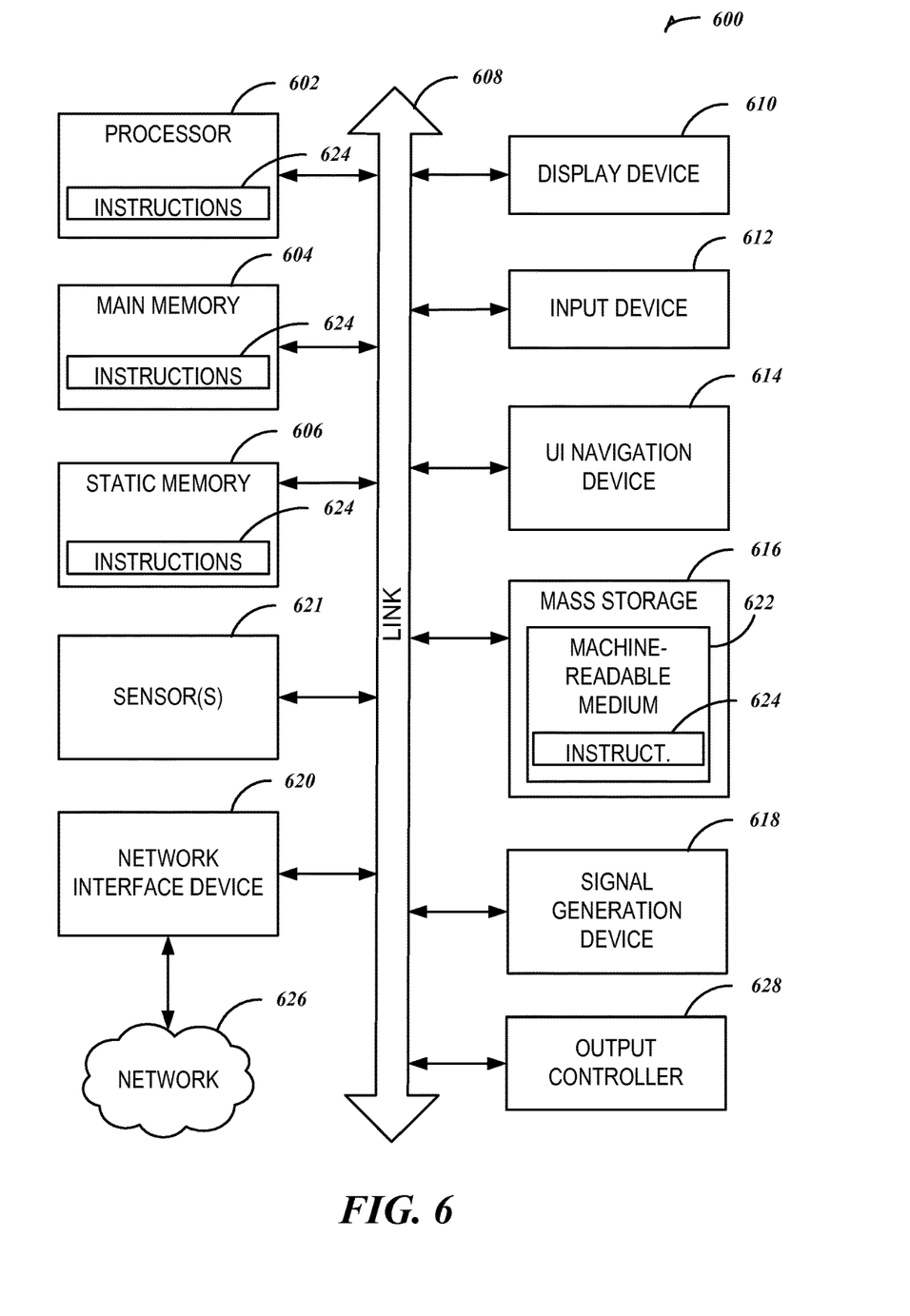
FIG. 6 illustrates a block diagram of an example machine upon which any one or more of the techniques (e.g., methodologies) discussed herein may be performed.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a processing unit, a graphics processing unit (GPU), a hardware processor core, or any combination thereof), a main memory 604, and a static memory 606, some or all of which may communicate with each other via a link 608 (e.g., a bus, link, interconnect, or the like). The machine 600 may further include a display device 610, an input device 612 (e.g., a keyboard), and a user interface (UI) pointing device 614 (e.g., a mouse). In an example, the display device 610, input device 612, and UI pointing device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, camera, video recorder, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The mass storage 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage 616 may constitute machine-readable media.

While the machine-readable medium 622 is illustrated as a single medium, the term "machine readable medium" may include a single medium or multiple media (e.g., a centralized or distributed database, and/or associated caches and servers) that configured to store the one or more instructions 624.

The term "machine-readable medium" may include any tangible medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 600, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Additional Notes & Examples

The following examples pertain to further embodiments. Specifics in the examples may be used anywhere in one or more embodiments.

Example 1 includes subject matter (such as an apparatus, a method, a means for performing acts, or a machine readable medium including instructions that, when performed by the machine, that cause the machine to perform acts), to determine social relationships, including: a SET for location determination in an unmanaged wireless local area network (WLAN), the SET comprising: a receiver to receive information for time-of-flight (ToF) measurements, the ToF measurements including a fine-time-measurement of a radio signal between two positions; a processor to: perform, using the information, the ToF measurements with a plurality of WLAN access points (APs) including transmitting an initiator message; gather results of the ToF measurements; and communicate the results to a position calculator.

In Example 2, the subject matter of Example 1 may optionally include, wherein the information for ToF measurements includes a list of WLAN APs to use for the ToF measurements.

In Example 3 the subject matter of any one or more of Examples 1 to 2 may optionally include: wherein the information for ToF measurements includes WLAN AP positions corresponding to members of the list of WLAN APs.

In Example 4 the subject matter of any one or more of Examples 1 to 3 may optionally include, comprising the position calculator, the position calculator to use the results of the ToF measurements and the WLAN AP positions to trilaterate a position of the SET.

In Example 5 the subject matter of any one or more of Examples 1 to 4 may optionally include: wherein the processor is to communicate the position of the SET to a location based service of a network to which the SET belongs.

In Example 6 the subject matter of any one or more of Examples 1 to 5 may optionally include, wherein the information for ToF measurements includes an access protocol to a WLAN AP in the plurality of WLAN APs, the access protocol including at least one of a credential or an encryption key to access the WLAN AP.

In Example 7 the subject matter of any one or more of Examples 1 to 6 may optionally include, wherein to gather the results includes determining respective ranges to the plurality of WLAN APs, and wherein the processor is to communicate the ranges to the position calculator, wherein the position calculator is remote from the SET.

In Example 8 the subject matter of any one or more of Examples 1 to 7 may optionally include, wherein to gather the results includes determining respective timer and transmit/receive (Tx/Rx) channel estimation data to the plurality of WLAN APs, and wherein the processor is to communicate the timer and transmit/receive (Tx/Rx) channel estimation data to the position calculator, wherein the position calculator is remote from the SET.

Example 9 includes subject matter (such as an apparatus, a method, a means for performing acts, or a machine readable medium including instructions that, when performed by the machine, that cause the machine to perform acts), comprising: a machine readable medium including instructions for time-of-flight (ToF) location determination in an unmanaged wireless local area network (WLAN) that, when executed by a SET, cause the SET to perform operations comprising: receiving, via a receiver of the SET, information for ToF measurements, the ToF measurements including a fine-time-measurement of a radio signal between two positions; performing, via hardware of the SET, the ToF measurements with a plurality of WLAN access points (APs) using the information, the performing including transmitting an initiator message; gathering, via the hardware of the SET, results of the ToF measurements; and communicating, via the hardware of the SET, the results to a position calculator.

In Example 10, the subject matter of Example 9 may optionally include, wherein the information for ToF measurements includes a list of WLAN APs to use for the ToF measurements.

In Example 11 the subject matter of any one or more of Examples 9 to 10 may optionally include: wherein the information for ToF measurements includes WLAN AP positions corresponding to members of the list of WLAN APs.

In Example 12 the subject matter of any one or more of Examples 9 to 11 may optionally include: the operations further comprising trilaterating, via a position calculator of the SET, a position of the SET using the results of the ToF measurements and the WLAN AP positions, wherein the position calculator is local to the SET.

In Example 13 the subject matter of any one or more of Examples 9 to 12 may optionally include: the operations further comprising communicating, via the hardware of the SET, the position of the SET to a location based service of a network to which the SET belongs.

In Example 14 the subject matter of any one or more of Examples 9 to 13 may optionally include: wherein the information for ToF measurements includes an access protocol to a WLAN AP in the plurality of WLAN APs, the access protocol including at least one of a credential or an encryption key to access the WLAN AP.

In Example 15 the subject matter of any one or more of Examples 9 to 14 may optionally include: wherein gathering the results includes determining respective ranges to the plurality of WLAN APs, and wherein communicating includes transmitting the ranges to the position calculator, wherein the position calculator is remote from the SET.

In Example 16 the subject matter of any one or more of Examples 9 to 15 may optionally include: wherein gathering the results includes determining respective timer and transmit/receive (Tx/Rx) channel estimation data to the plurality of WLAN APs, and wherein communicating includes transmitting the timer and transmit/receive (Tx/Rx) channel estimation data to the position calculator, wherein the position calculator is remote from the SET.

Example 17 includes subject matter (such as an apparatus, a method, a means for performing acts, or a machine readable medium including instructions that, when performed by the machine, that cause the machine to perform acts), comprising: a method for time-of-flight (ToF) location determination of a SET in an unmanaged wireless local area network (WLAN), the method comprising: receiving, via a receiver of the SET, information for ToF measurements, the ToF measurements including a fine-time-measurement of a radio signal between two positions; performing, via hardware of the SET, the ToF measurements with a plurality of WLAN access points (APs) using the information, the performing including transmitting an initiator message; gathering, via the hardware of the SET, results of the ToF measurements; and communicating, via the hardware of the SET, the results to a position calculator.

In Example 18, the subject matter of Example 17 may optionally include, wherein the information for ToF measurements includes a list of WLAN APs to use for the ToF measurements.

In Example 19 the subject matter of any one or more of Examples 17 to 18 may optionally include: wherein the information for ToF measurements includes WLAN AP positions corresponding to members of the list of WLAN APs.

In Example 20 the subject matter of any one or more of Examples 17 to 19 may optionally include: trilaterating, via a position calculator of the SET, a position of the SET using the results of the ToF measurements and the WLAN AP positions, wherein the position calculator is local to the SET.

In Example 21 the subject matter of any one or more of Examples 17 to 20 may optionally include: communicating, via the hardware of the SET, the position of the SET to a location based service of a network to which the SET belongs.

In Example 22 the subject matter of any one or more of Examples 17 to 21 may optionally include: wherein the information for ToF measurements includes an access protocol to a WLAN AP in the plurality of WLAN APs, the access protocol including at least one of a credential or an encryption key to access the WLAN AP.

In Example 23 the subject matter of any one or more of Examples 17 to 22 may optionally include: wherein gathering the results includes determining respective ranges to the plurality of WLAN APs, and wherein the communicating includes transmitting the ranges to the position calculator, wherein the position calculator is remote from the SET.

In Example 24 the subject matter of any one or more of Examples 17 to 23 may optionally include, wherein gathering the results includes determining respective timer and transmit/receive (Tx/Rx) channel estimation data to the plurality of WLAN APs, and wherein the communicating includes transmitting the timer and transmit/receive (Tx/Rx) channel estimation data to the position calculator, wherein the position calculator is remote from the SET.

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A SET for location determination in an unmanaged wireless local area network (WLAN), the SET comprising:
   a receiver to receive information for time-of-flight (ToF) measurements, the ToF measurements including a fine-time-measurement of a radio signal between two positions, wherein the information includes a list of WLAN access points (APs) to use for the ToF measurements;
   a processor to:
   cause transmission of an initiator message to perform, using the information, the ToF measurements with a plurality of WLAN access points, wherein the list of WLAN APs comprises the plurality of WLAN APs;
   gather results of the ToF measurements based on the transmission of the initiator message; and
   communicate the results to a position calculator.

2. The SET of claim 1, wherein the information for ToF measurements includes WLAN AP positions corresponding to members of the list of WLAN APs.

3. The SET of claim 2, comprising a position calculator, the position calculator to use the results of the ToF measurements and the WLAN AP positions to trilaterate a position of the SET.

4. The SET of claim 3, wherein the processor is to communicate the position of the SET to a location based service of a network to which the SET belongs.

5. The SET of claim 1, wherein the information for ToF measurements includes an access protocol to a WLAN AP in the plurality of WLAN APs, the access protocol including at least one of a credential or an encryption key to access the WLAN AP.

6. The SET of claim 1, wherein to gather the results includes determining respective ranges to the plurality of WLAN APs, and wherein the processor is to communicate the ranges to the position calculator, wherein the position calculator is remote from the SET.

7. The SET of claim 1, wherein to gather the results includes determining timer and transmit/receive (Tx/Rx) channel estimation data respective to the plurality of WLAN APs, and wherein the processor is to communicate the timer and transmit/receive (Tx/Rx) channel estimation data to the position calculator, wherein the position calculator is remote from the SET.

8. A machine readable medium including instructions for time-of-flight (ToF) location determination in an unmanaged wireless local area network (WLAN) that, when executed by a SET, cause the SET to perform operations comprising:
   receiving, via a receiver of the SET, information for ToF measurements, the ToF measurements including a fine-time-measurement of a radio signal between two positions, wherein the information includes a list of WLAN access points (APs) to use for the ToF measurements;
   causing transmission of an initiator message to perform, via hardware of the SET, the ToF measurements with a plurality of WLAN access points, wherein the list of WLAN APs comprises the plurality of WLAN APs;
   gathering, via the hardware of the SET, results of the ToF measurements based on the transmission of the initiator message; and
   communicating, via the hardware of the SET, the results to a position calculator.

9. The machine readable medium of claim 8, wherein the information for ToF measurements includes WLAN AP positions corresponding to members of the list of WLAN APs.

10. The machine readable medium of claim 9, the operations further comprising trilaterating, via a position calculator of the SET, a position of the SET using the results of the ToF measurements and the WLAN AP positions, wherein the position calculator is local to the SET.

11. The machine readable medium of claim 10, the operations further comprising communicating, via the hardware of the SET, the position of the SET to a location based service of a network to which the SET belongs.

12. The machine readable medium of claim 8, wherein the information for ToF measurements includes an access protocol to a WLAN AP in the plurality of WLAN APs, the access protocol including at least one of a credential or an encryption key to access the WLAN AP.

13. The machine readable medium of claim 8, wherein gathering the results includes determining respective ranges to the plurality of WLAN APs, and wherein communicating includes transmitting the ranges to the position calculator, wherein the position calculator is remote from the SET.

14. The machine readable medium of claim 8, wherein gathering the results includes determining timer and transmit/receive (Tx/Rx) channel estimation data respective to the plurality of WLAN APs, and wherein communicating includes transmitting the timer and transmit/receive (Tx/Rx) channel estimation data to the position calculator, wherein the position calculator is remote from the SET.

15. A method for time-of-flight (ToF) location determination of a SET in an unmanaged wireless local area network (WLAN), the method comprising:
   receiving, via a receiver of the SET, information for ToF measurements, the ToF measurements including a fine-time-measurement of a radio signal between two positions, wherein the information includes a list of WLAN access points (APs) to use for the ToF measurements;
   causing transmission of an initiator message to perform, via hardware of the SET, the ToF measurements with a plurality of WLAN access points, wherein the list of WLAN APs comprises the plurality of WLAN APs;

gathering, via the hardware of the SET, results of the ToF measurements based on the transmission of the initiator message; and communicating, via the hardware of the SET, the results to a position calculator.

16. The method of claim 15, wherein the information for ToF measurements includes WLAN AP positions corresponding to members of the list of WLAN APs.

17. The method of claim 16, further comprising trilaterating, via a position calculator of the SET, a position of the SET using the results of the ToF measurements and the WLAN AP positions, wherein the position calculator is local to the SET.

18. The method of claim 17, further comprising communicating, via the hardware of the SET, the position of the SET to a location based service of a network to which the SET belongs.

19. The method of claim 15, wherein the information for ToF measurements includes an access protocol to a WLAN AP in the plurality of WLAN APs, the access protocol including at least one of a credential or an encryption key to access the WLAN AP.

20. The method of claim 15, wherein gathering the results includes determining respective ranges to the plurality of WLAN APs, and wherein the communicating includes transmitting the ranges to the position calculator, wherein the position calculator is remote from the SET.

21. The method of claim 15, wherein gathering the results includes determining timer and transmit/receive (Tx/Rx) channel estimation data respective to the plurality of WLAN APs, and wherein the communicating includes transmitting the timer and transmit/receive (Tx/Rx) channel estimation data to the position calculator, wherein the position calculator is remote from the SET.

22. The SET of claim 1, wherein the SET is a user equipment.

23. The machine readable medium of claim 8, wherein the SET is a user equipment.

24. The method of claim 15, wherein the SET is a user equipment.

* * * * *

UNITED STATES PATENT AND TRADEMARK OFFICE
CERTIFICATE OF CORRECTION

PATENT NO.        : 10,061,011 B2
APPLICATION NO.   : 14/905089
DATED             : August 28, 2018
INVENTOR(S)       : Itai Steiner It is certified that error appears in the above-identified patent and that said Letters Patent is hereby corrected as shown below:

On the Title Page

Item (60), "Related U.S. Application Data", in Column 1, Line 2, delete "28, 203." and insert --28, 2013.-- therefor
Signed and Sealed this<br>
Eleventh Day of June, 2019

Andrei Iancu
*Director of the United States Patent and Trademark Office*